Oct. 14, 1958 R. C. SANFORD 2,856,560
AUTOMATIC PICTURE SIZE CONTROL
Filed Aug. 19, 1955
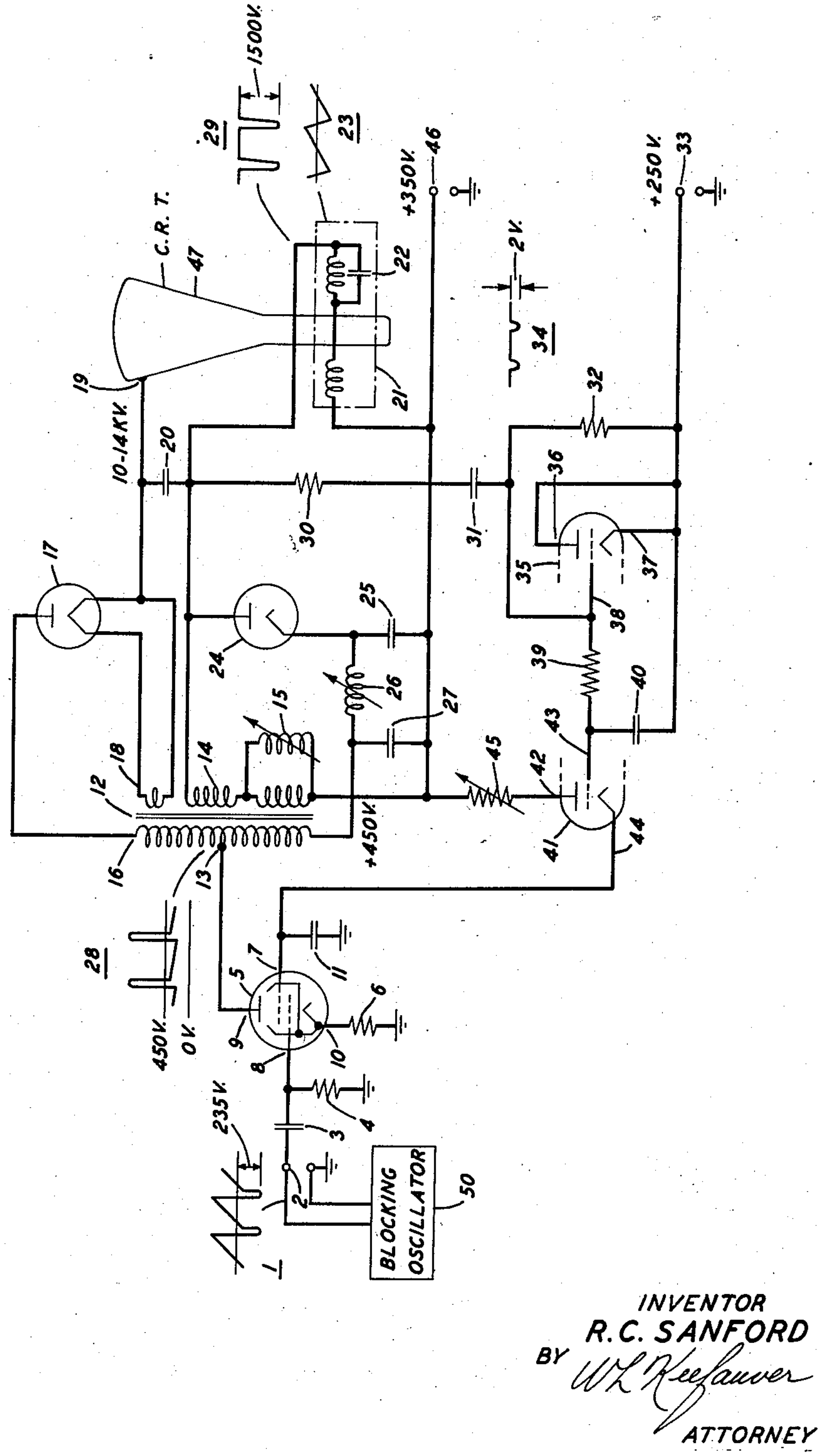
INVENTOR
R. C. SANFORD
BY W. L. Keefauver
ATTORNEY

United States Patent Office 2,856,560

Patented Oct. 14, 1958

2,856,560

AUTOMATIC PICTURE SIZE CONTROL

Robert C. Sanford, Flushing, N. Y., assignor to Bell Telephone Laboratories, Incorporated, New York, N. Y., a corporation of New York Application August 19, 1955, Serial No. 529,430

6 Claims. (Cl. 315—27)

This invention relates generally to regulating systems for the amplitude control of high voltage low current electric waves, and more particularly to the automatic control of picture width in television receivers employing a "flyback" horizontal deflection system.

In electronic equipment employing cathode ray tubes, such as television receivers, the picture width produced by the deflecting means varies with fluctuations in brightness, line voltage, and contrast (video amplifier gain). Further, in television receivers which derive the cathode ray tube accelerating anode high voltage from the "flyback" of the horizontal scanning system, this accelerating anode voltage also fluctuates and causes undesirable variations in picture width with changes in picture brightness.

Therefore, an object of this invention is to maintain the width of the image on the cathode ray tube constant despite fluctuations in line voltage, brightness, and contrast.

Another object of the present invention is to improve the regulation of the amplitude of the sawtooth current wave in the deflection coils of an electromagnetic sweep system.

A further object is to maintain the accelerating anode voltage of the cathode ray tube constant, so that picture size remains fixed independently of the picture brightness. In the conventional television receiver there is a marked tendency for picture size to vary with picture brightness for the reason that increased anode current due to a brighter picture causes the anode voltage to drop, and, as the anode voltage is reduced, the deflection sensitivity of the cathode ray beam increases. In order to produce a desirable picture, therefore, it is necessary that the sawtooth current wave applied to the deflecting means and the voltage applied to the high voltage anode of the cathode ray tube be held constant despite fluctuations in the sawtooth generating circuits. Various regulation arrangements have been in use for low voltage applications, but most of these are not suitable for high voltage applications where the current drain is comparatively small.

The present invention comprises a novel size control system incorporated in the conventional deflection system. In accordance with the invention, a portion of the deflection voltage appearing across the cathode ray tube deflection coils is fed back to the deflection transformer driver tube through the medium of a series regulator tube. In the particular embodiment described below, which should be understood to be for illustrative purposes only, this feedback is employed to regulate the screen grid voltage of the driver tube in accordance with fluctuations in the amplitude of the deflection voltage. Because the accelerating anode voltage for the cathode ray tube is derived from the deflection voltage wave in the embodiment described, automatic regulation of this voltage is simultaneously effected without further modification of the conventional deflection system.

A feature of the present invention is that the regulation of the wave amplitude is accomplished without changing in any way the frequency of the waveforming circuits.

Further objects and advantages of the invention will be apparent from a consideration of the following description when taken in connection with the accompanying drawing in which is schematically represented a specific embodiment of a "flyback" type of horizontal deflection system for a television receiver including a control circuit in accordance with the invention.

Briefly, the figure shows a horizontal deflection system for a television receiver including a screen grid beam power tube 5 driving a "flyback" transformer 12 to a secondary winding of which are matched the horizontal yoke deflecting coils 21. In accordance with the invention, the conventional system is improved by the addition of a feedback circuit which derives a portion of the voltage appearing across the deflection coils, and applies this voltage to the screen grid of the deflection transformer driver tube 5 by way of series regulator tube 41. By means of the feedback circuit, an increase in voltage across the deflection coils causes a decrease in screen grid current and a consequent reduction in gain of the driver tube. Conversely, a decrease in deflection voltage causes an increase in driver tube gain. The control circuit can be arranged so that the peak voltage across the deflection coils remains substantially constant through relatively wide variations in the oscillator circuits. With a picture width control embodying features of this invention, the frequency of the horizontal deflection system is not changed, since the sawtooth-forming circuits are not in any way altered.

In the figure there is illustrated a conventional system for deflecting the cathode ray tube beam along the horizontal axis and for furnishing a high direct-current voltage to the cathode ray tube accelerating anode, including a control circuit in accordance with the invention. The basic deflecting system used as a setting for the present invention is similar to one described, for example, in Television Principles by R. B. Dome, published in 1951 by McGraw-Hill Publishing Company, at page 237. It should be understood, of course, that the invention is not limited in use to circuits of this type. The principles of the invention are equally applicable to the control of the vertical output wave amplitude in television receivers, and to the control of other oscillator circuits employing screen grid tubes for producing sawtooth, pulse and sine wave outputs. The low voltage power supplies are not shown in the drawing for reasons of simplicity.

Discussing the circuit now in more detail, the deflecting system includes a beam power pentode 5 having a cathode 10, a screen grid 7, a control grid 8, and a plate 9. The tube 5 acts as a power amplifier for an oscillator 50 having a substantially sawtooth output voltage wave as shown in waveform 1. The oscillator 50, shown in block form in the drawing, may be a blocking oscillator type well known in the art whose output is applied at terminal 2 to the grid 8 of tube 5 through coupling capacitor 3. Grid 8 is connected to a ground reference point through resistor 4. Self-bias for tube 5 is provided by the voltage appearing across resistor 6 connected between cathode 10 and a ground reference point. The heater (not shown) is operated from an appropriate low voltage supply (not shown). The screen grid 7 is bypassed to ground for high frequency by capacitor 11, and also is connected to the control circuit as will be explained subsequently. The plate 9 of tube 5 is connected to an intermediate point 13 of the primary winding of deflection transformer 12. Transformer 12 may be of the well known high efficiency ferrite core type of a standard design used in many present day television receivers.

The upper end 16 of an extension of the primary winding of transformer 12 is connected to the anode of a high voltage rectifier tube 17. The filament supply voltage for rectifier 17 is derived in the conventional manner from a secondary winding 18 on transformer 12. The high voltage of the order of 10 kilovolts or more, derived from rectifier 17, is filtered by capacitor 20 and is made available at terminal 19 as an accelerating anode supply for the cathode ray tube 47. To obtain voltages up to 30 kilovolts, voltage doubler circuits may be employed without necessitating any changes in the control circuit which is a feature of this invention.

The secondary winding 14 of transformer 12 matches the output impedance of tube 5 to that of the deflection coils 21, which are connected across winding 14. The deflection coils may be incorporated in a deflection yoke for mounting on the neck of a cathode ray tube in a conventional manner. Capacitor 22 serves to effect a suitable natural resonant frequency for the deflection system. The plate of a diode 24 is connected to the upper end of secondary winding 14 for purposes to be described below. The cathode of diode 24 is connected through a filter circuit comprising capacitors 25 and 27 and variable inductor 26 to the lower end of primary winding 16 of transformer 12. The lower ends of the deflection coils 21, capacitors 25 and 27, and secondary winding 14 of transformer 12 are connected to a direct-current supply made available at terminal 46 from a low voltage power supply at approximately 350 volts positive, not shown in the drawing. Variable inductor 15, connected across a portion of the secondary winding 14, is the normal picture width control and partially shunts that winding for initial adjustment of picture width. Inductor 15 may very well be dispensed with once the principles of this invention are applied to the circuit.

The operation of the conventional television receiver horizontal deflection system outlined above will be described briefly before introducing the improvements effected by the application of the principles of this invention to this standard circuit. The voltage wave 1, applied to the control grid 8 of driver tube 5, which is biased for class A operation during the sawtooth portion of the input wave, has a linear, slowly rising sawtooth portion and a rapidly falling, substantially, rectangular pulse portion. During the sawtooth portion of the input wave, the plate current of tube 5 rises slowly and causes a slow buildup of the current through the primary winding 16 of transformer 12. The sawtooth current wave produced in the primary winding 16 is induced through transformer action in the secondary winding 14, which is connected to deflection coils 21 positioned on the neck of the cathode ray tube. The sawtooth current in coils 21, shown in waveform 23, produces a magnetic field which deflects the cathode ray tube beam from left to right across the face of the tube and produces a visible trace.

When the negative pulse portion of the input wave reaches the grid 8 of tube 5, the plate current is suddenly cut off. The magnetic field, which was steadily building up in the transformer 12, begins to collapse at a rate determined by the natural resonant frequency of the system. Because the secondary winding 14 is oppositely poled from the primary winding 16, the voltage generated by the collapsing magnetic field is negative, as shown in waveform 29. The deflection current drops rapidly and the electron beam of the cathode ray tube is returned to the left side of the tube. However, since the system has a natural resonant frequency, oscillations tend to occur. This is where diode 24 performs its function, which is to damp this oscillation as it swings positive and rectify it to produce a voltage across the filter circuit comprising capacitors 25 and 27 and inductor 26. The magnetic field collapse, as now damped by the diode 24, decays at a rate determined by the load of the damping tube across the coil, and starts the beam across the cathode ray tube screen toward the right. Adjustment of inductor 26 determines the linearity of this decay. Since the diode conducts whenever the voltage in the secondary 14 tends to go positive, the voltage across the deflection coils 21 resembles that shown in waveform 29. The voltage appearing across the filter circuit, about 70 to 100 volts in magnitude, is added to the low voltage supply to produce a "boost" voltage, which serves as a plate supply for driver tube 5. The operation described above must occur 15,750 times per second under the 525-line, 30-frame per second United States television standards.

The high voltage power supply also derives its power from the collapse of the magnetic field in the output transformer 12. When tube 5 is cut off, a positive pulse as previously described appears on the primary winding 16. This pulse is stepped up by autotransformer action to a very high value, and is rectified by tube 17. Since the frequency of the pulses is 15,750 cycles per second, sufficient filtering is provided by a single capacitor 20. The lower end of the capacitor may be connected to the secondary 14 instead of ground in order to benefit from the additional several hundred volts existing between that point and ground.

In order to stabilize the operation of the standard deflection system as just described, the principles of this invention are employed to provide an automatic control circuit. A voltage divider comprising resistors 30 and 32 and capacitor 31 is connected from the top of the deflection coils 21 to a reference point, such as terminal 33 located at a suitable potential above ground reference. The potential at terminal 33 should be approximately that required at the screen grid of tube 5 for normal operation without the control circuit. In the embodiment shown in the drawing, this potential is approximately 250 volts. Across resistor 32 is developed a small proportion of the deflection voltage as indicated approximately by waveform 34. It may be necessary to make resistor 32 adjustable, or to exercise care in the choice of exact value, in order to obtain the correct bias for the grid 43 of tube 41. Capacitor 31, in addition to its function in the voltage divider, serves to block direct current from the control circuit. In parallel with resistor 32, a tube 35 poled for conduction toward reference terminal 33 is connected to act as a low resistance shunt across resistor 32 should the top end of that resistor become positive with respect to the reference voltage. Although tube 35 is a triode, it actually functions as a diode in this circuit. The plate 36 and cathode 37 are connected together to form effectively a cathode, and grid 38 is shown performing the function of an anode. This arrangement is used so that the cylindrical plate 36 acts as an electrostatic shield and prevents possible radiation of 15,750-cycle components. The relative values of resistors 30 and 32 are chosen to provide a small direct voltage of about two volts negative. Resistor 30 is preferably of high resistance, of the order of several megohms, to load the deflection coils as lightly as possible.

The rectified output appearing across the tube 35 is smoothed out by the filtering action of resistor 39 and capacitor 40 into a steady negative voltage, which serves as grid bias for series regulator tube 41. Tube 41 is a triode connected with plate to cathode circuit serving as a variable resistance in series with the screen grid of output tube 5. The plate 42 of tube 41 is connected to the screen voltage supply 46 through adjustable resistor 45. The cathode 44 of tube 41 is connected to the screen grid 7 of tube 5. The voltage appearing across capacitor 40 is applied as bias to control grid 43 of tube 41. Since the cathodes of tubes 35 and 41 are at the high reference potential, it is obvious that either a high degree of insulation must be provided between heaters and cathodes or insulated heater transformers must be employed. Tubes 35 and 41 in the control circuit may well be a dual triode enclosed in a single tube envelope, such as a 6SN7GT type. After an initial adjustment of resistor 45 and inductor 15, if found necessary, for correct picture width under average conditions, the operation of the control circuit is such as to maintain the voltage at the screen grid 7 of tube 5 at the correct voltage to hold the amplitude of deflection voltage wave 29 substantially constant. Although tube 41 is shown as a triode in the embodiment, it should be understood that a pentode might well be employed here as a series regulator device, and, in fact, would result in more sensitive control of tube 5 screen grid voltage.

The specific control circuit described has been found to operate satisfactorily when the following circuit values are used:

| | |
|---|---|
| Deflection yoke | RCA type 211T1. |
| Tube **5** | 6BG6–GT. |
| Tube **17** | 1B3–GT. |
| Tube **24** | 5V4G or 5W4. |
| Tube **35** | ½ 6SN7GT. |
| Tube **41** | ½ 6SN7GT. |
| Transformer **12** | RAM type XF45. |
| Capacitor **3** | 0.01 $\mu f$ paper. |
| Capacitor **11** | 10 $\mu f$ electrolytic. |
| Capacitor **20** | 500 $\mu\mu f$ ceramic. |
| Capacitor **22** | 10 $\mu\mu f$ mica. |
| Capacitor **25** | 0.1 $\mu f$ paper. |
| Capacitor **27** | 0.1 $\mu f$ paper. |
| Capacitor **31** | 0.001 to 0.005 $\mu f$ paper. |
| Capacitor **40** | 0.01 to 0.05 $\mu f$ paper. |
| Resistor **4** | 0.5 MΩ. |
| Resistor **6** | 120 Ω. |
| Resistor **30** | 10 MΩ. |
| Resistor **32** | 200 K. |
| Resistor **39** | 250 K.–1 MΩ. |
| Resistor **45** | 5 K., 10 watt rheostat or adjustable resistor. |
| Inductor **15** | RCA type 201R4 width control. |
| Inductor **26** | RCA type 201R5 linearity control. |

Values of capacitor 40 and resistor 39 were chosen to give a time constant about 1,000 times that of horizontal sweep, which is about 64 $\mu$sec for the 15,750 cycles per second sweep frequency. Circuit values, voltages, and waveforms described and shown are approximate and solely by way of example. It would be obvious to one skilled in the art that other values can be found adaptable to other basic circuits to which the principles of the present invention might be applied.

Although the invention has been described with reference to a specific embodiment, other embodiments and modifications thereof will readily occur to one skilled in the art so that the invention should not be deemed limited to the embodiment specifically shown and described.

What is claimed is:

1. A system for maintaining constant the amplitude of a desired waveform without affecting the frequency thereof comprising an electric wave source, a screen grid vacuum tube as output means for said source, a voltage source for said screen grid, a utilization circuit coupled to said vacuum tube and having a voltage developed thereacross, means comprising a voltage divider connected to said utilization circuit for deriving from said utilization circuit a portion of the voltage developed thereacross, rectifying means connected to said voltage-divider means for deriving a direct-current voltage from said voltage portion, said last-mentioned means having at least effective anode and cathode elements, filtering means for said derived direct-current voltage comprising a series resistor and a parallel capacitor circuit, means for connecting one terminal of said resistor to said effective anode and one terminal of said capacitor to ground, a control tube having at least an anode, a cathode, and a control grid, means connecting the anode-cathode path of said control tube in series relationship with said screen grid and said voltage source, means for effecting initial adjustment of said control tube comprising an adjustable resistance connected between said voltage source and anode-cathode path, and circuit means for connecting a common terminal of said series resistor and parallel capacitor to the control grid of said control tube for applying the voltage appearing across said filtering means to the control grid of said control tube and thereby varying the effective resistance of said anode-cathode path in accordance with the variations in the amplitude of the voltage developed across said utilization circuit.

2. The system in accordance with claim 1 in which said rectifying means comprises an electron tube having a substantially cylindrical plate element and grid and cathode elements, means for preventing radiation from within said rectifying tube comprising means connecting said plate and cathode elements together to form said effective cathode, said grid forming said effective anode, and means to connect said last-mentioned cathode and anode to preselected points on said voltage-divider means for rectifying a predetermined amount of the voltage portion derived thereacross.

3. In a cathode ray tube beam deflection circuit having a sawtooth wave source, a deflection coil, an output tube for said wave source for driving a beam deflecting sawtooth wave current through said coil, a screen grid for said output tube, inductance means for coupling said tube to said coil, and a voltage source for said screen grid, means for compensating variations in amplitude of a deflecting voltage developed across said coil by said beam deflecting current, said means comprising a capacitor, rectifying means, means to connect said capacitor across the output of said rectifying means, said rectifying means charging said capacitor proportionately in response to said beam deflecting voltage, means for supplying a portion of the beam deflecting voltage from said coil to said rectifying means, a control tube having at least an anode, cathode, and control grid, means for connecting the anode-cathode path of said control tube in series with said screen grid and said voltage source, and means for causing the voltage at said screen grid to vary in a manner to compensate for variations in the amplitude of said deflection voltage, said last-named means comprising an electrical connection from a common terminal of said capacitor and the output of said rectifying means to the grid of said control tube.

4. A system for maintaining constant a desired waveform of variable amplitude comprising a first electron tube having a cathode, anode, control and screen grid electrodes, a utilization circuit coupled to said anode, means for supplying a timing wave to said control electrode to develop a voltage across said utilization circuit, a second electron tube having effectively an anode and a cathode and functioning as a diode rectifier, means for supplying a portion of the voltage developed across said utilization circuit to the effective anode of said second tube, a third electron tube having at least an anode, cathode, and control electrode, a source of positive voltage connected to said last-mentioned anode, means connecting the anode-cathode path of said third tube and said last-mentioned voltage source in series with the screen grid of said first tube, and filtering means for applying the rectified output of said second tube from the effective anode thereof to the control electrode of said third tube whereby said third tube is biased by said rectified output in response to the variation in amplitude of said utilization voltage to offset said last-mentioned variation.

5. In electronic apparatus including a cathode ray tube having an accelerating anode and coils for deflecting the electron beam of said tube, a system for regulating the amplitude of a sawtooth current in said deflecting coils and the magnitude of a high direct voltage for accelerating said electron beam comprising an oscillator including a first electron tube having plate and screen grid electrodes, an output transformer having a primary winding and first and second secondary windings, means for connecting said plate electrode to said primary winding thereby producing a sawtooth current in said transformer, first rectifying means connected to said first secondary winding for supplying a direct-current accelerating potential to the anode of said cathode ray tube, means for connecting said second secondary winding to said deflection coils whereby a sawtooth deflecting current is produced in said coils and a corresponding voltage thereacross, means for controlling the amplitude of the output of said first electron tube in accordance with departures of the voltage across said deflecting coils from a predetermined reference voltage comprising a resistor-capacitor voltage divider connected to said deflecting coils for deriving therefrom a portion of the voltage developed thereacross, second rectifying means connected to a portion of said voltage divider for rectifying said voltage portion, means for smoothing the rectified voltage portion thereby producing a continuous control voltage, a source of direct-current potential for the screen grid of said first electron tube chosen to establish said reference voltage across said deflecting coils, a second electron tube having at least an anode, a cathode, and a control grid, means for connecting the anode-cathode path of said second electron tube in series with said potential source and said screen grid, and means for connecting said control grid to said smoothing means whereby the effective resistance of said second electron tube and hence the screen grid potential of said first electron tube are controlled.

6. In a circuit comprising a cathode ray oscilloscope including a beam deflecting coil, a source of voltage of predetermined frequency, an electron tube including an input circuit, an output circuit, and a control electrode, and circuit means for connecting said source to said input circuit and said output circuit to said deflecting coil to supply the predetermined voltage of said source to said deflecting coil and thereby generate a voltage thereacross, means for continuously controlling the amplitude of the predetermined voltage supplied from said output circuit to said deflecting coil, said last-mentioned means comprising means connected to said deflecting coil for deriving therefrom a portion of the voltage developed thereacross, and means connected to said deriving means for rectifying the derived voltage portion to supply a direct-current voltage of varying magnitude to said control electrode and thereby control the amplitude of the predetermined voltage supplied from said output circuit to said deflecting coil in accordance with variations in the amplitude of the voltage generated across said deflecting coil.

References Cited in the file of this patent

UNITED STATES PATENTS

| | | |
|---|---|---|
| 2,018,540 | Wheeler | Oct. 22, 1935 |
| 2,510,027 | Torsch | May 30, 1950 |
| 2,697,798 | Schlesinger | Dec. 21, 1954 |